Feb. 19, 1963
H. F. KENYON
3,078,432
ELECTRICAL CONNECTIONS BETWEEN RELATIVELY
ROTATING ELECTRICAL CONDUCTORS
Filed March 27, 1959
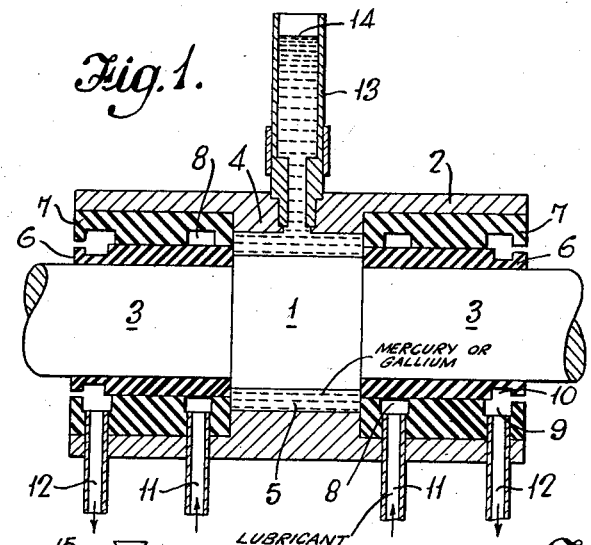
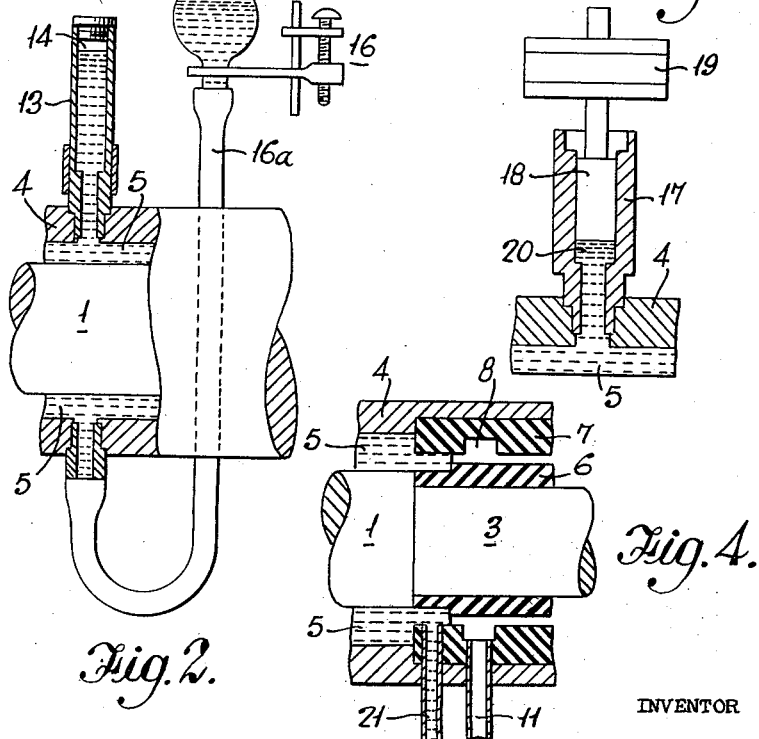
INVENTOR
HAROLD FREDERICK KENYON

United States Patent Office 3,078,432
Patented Feb. 19, 1963

3,078,432
ELECTRICAL CONNECTIONS BETWEEN RELATIVELY ROTATING ELECTRICAL CONDUCTORS
Harold Frederick Kenyon, Reading, England, assignor to Metropolitan-Vickers Electrical Company Limited, London, England, a British company
Filed Mar. 27, 1959, Ser. No. 802,445
Claims priority, application Great Britain Mar. 31, 1958
6 Claims. (Cl. 339—8)

This invention relates to electrical connections between relatively rotating electrical conductors.

The invention is concerned with contacts of the kind comprising a liquid metal (e.g. mercury) filled annular space bordered on one side by one of said conductors and on another side by the other conductor so that the liquid metal provides a continuous electrical connection between the relatively rotating members.

In such arrangements it is necessary to seal the liquid metal space between the relatively rotating conductors against leakage and in prior arrangements this has been effected by sealing members connected to each of said conductors and of a material which is not wetted by the liquid metal (e.g. mercury) and between which are relatively rotating sealing surfaces to which there is a small clearance so as to avoid the escape of liquid metal. The sealing surfaces may also act as mechanical bearings.

In arrangements of this kind, as proposed hitherto, it has been necessary both to allow for thermal expansion of the mercury and to lubricate the sealing surfaces and for this purpose the liquid metal space has been partially filled with a lubricant. The lubricant, being able to wet the sealing surfaces, spreads between them and lubricates them. If the liquid metal expands, more oil is forced between the surface and if it retracts, the oil is retracted into the liquid metal space.

With such arrangements, however, it has been found that there is a liability for the oil and liquid metal, especially where this is mercury, to emulsify on rotation due to the large interface between the oil and the liquid metal.

The main object of the invention is to provide an improved arrangement which avoids this disadvantage.

According to the present invention an electrical connection formed between relatively rotating inner and outer conductors comprises an annular liquid metal filled space extending between the conductors so as to provide a continuous electrical connection between said conductors and a seal for said liquid metal filled annulus provided by relatively rotating sealing members surfaced with a material which is not wetted by the liquid metal is provided with means for applying a static pressure to the liquid metal in the annulus, said means including an external expansion space for the liquid metal and the annulus being substantially completely filled with liquid metal.

With such an arrangement the static pressure should be sufficient to withstand the pumping pressure set up between the relatively rotating surfaces bordering the annulus but must not be so great as to cause leakage of liquid metal between the sealing surfaces when the parts are stationary.

Preferably the outer conductor is fixed and the inner conductor rotates.

The liquid metal is preferably mercury though other liquid metals such as gallium, which are liquid at relatively low temperatures, can be used.

In carrying out the invention the sealing surfaces may also act as mechanical bearings for the rotating contact and in such a case circumferential grooves may be provided in the bearings for the lubricant, there being an inlet groove at the end of the bearing which is adjacent the annulus and an outlet groove at the end of the bearings which is remote from the annulus.

In order that the invention may be more clearly understood reference will now be made to the accompanying drawing in which:

FIG. 1 shows diagrammatically one embodiment of the invention, and

FIGS. 2, 3 and 4 respectively show modified arrangements.

In the drawing the reference 1 indicates the rotating inner conductor and 2 the outer stationary conductor. The inner conductor 1 is carried on a shaft 3. Between the inner conductor 1 and a thickened portion 4 of the outer member is a mercury filled annulus 5 which provides the electrical connection between the conductors 1 and 2. A mechanical bearing on each side of the mercury annulus is provided by an inner sleeve 6 fixed around the shaft 3 and an outer sleeve 7 which is fixed within the outer conductor 2. These sleeves are of material which is not wetted by the mercury for example Bakelite and form a seal to the mercury annulus able to withstand appreciable pressure. At a point axially adjacent the mercury annulus is an inlet channel 8 which extends circumferentially around the outer sleeve 7 adjacent the bearing surface. Also extending around the outer sleeve 7 at a point axially remote from the mercury annulus is an outlet channel which, as shown, is formed with a cooperating channel 10 in the inner surface. Inlet supply ducts 11 feed lubricant into the space 8 from whence it percolates along the bearing surface and is drained from the outlet channel 9 by way of the outlet duct 12.

The invention consists in applying a static pressure of mercury in the annulus 5 by means of the header tube 13 which extends upwardly from the annulus and is filled with mercury up to a suitable height 14 so as to provide the necessary static head in the annulus. At the same time the header tube 13 provides for thermal expansion and contraction of the mercury.

FIG. 2 shows a modification in which a mercury reservoir 15 is connected through a flexible pipe 16a to the underneath side of the annulus 5. Provision 16 is made for adjusting the height of the reservoir 15 and this enables the pressure head in the mercury annulus to be adjusted.

FIG. 3 shows an alternative arrangement in which the header tube 13 is replaced by a cylinder 17 in which moves a plunger 18 pressed down by weights 19, a space 20 below the piston 18 communicating with the mercury annulus 5 and hence the weight 19 sets up static pressure in the annulus.

FIG. 4 shows a still further arrangement in which the mercury inlet is through the pipe 21 which opens into a suitably narrow extension of the mercury annulus formed between portions of the sleeves 6 and 7. The purpose of this arrangement is to reduce the back pressure exerted at the opening of the inlet tube due to the radial pressure gradient induced in the mercury by rotation.

While in the specific embodiment shown the outer conductor is fixed and the inner conductor rotates, it will be understood that the invention is applicable to arrangements in which the inner conductor is fixed and the outer conductor rotates. In such cases the lubricant could be supplied through passages extending axially through the inner member.

What I claim is:

1. An electrical connection formed between relatively rotatable inner and outer conductors comprising surfaces defining an annular space extending between said conductors, a liquid metal filling to said annular space forming a continuous electrical connection between said conductors, a seal on each side of said annular space, each seal being formed by relatively rotatable inner and outer sealing members having co-acting surfaces of a material which is not wetted by the liquid metal, means for supplying lubricant to the co-acting surfaces of said sealing members and a supplemental chamber partially filled with said liquid metal and communicating with said annular space to apply a static pressure thereto, said chamber including means for varying said static pressure.

2. An electrical connection formed between relatively rotatable inner and outer conductors comprising surfaces defining an annular space extending between said conductors, a mercury filling to said annular space for a continuous electrical connection between said conductors, a seal on each side of said annular space, each seal being formed by relatively rotatable inner and outer sealing members having co-acting surfaces of a material which is not wetted by the mercury, means for supplying lubricant to the co-acting surfaces of said sealing members and a supplemental chamber partially filled with mercury and communicating with said annular space to apply static pressure thereto, said chamber including means for varying said static pressure.

3. An electrical connection formed between an outer conductor and an inner conductor rotatable within the outer conductor comprising surfaces defining an annular space extending between the conductors, a liquid metal filling to said annular space forming a continuous electrical connection between the conductors, a seal on each side of said annular space each seal formed by an inner sealing member rotatable within an outer sealing member the sealing members having co-acting surfaces of a material which is not wetted by the liquid metal, means for supplying lubricant to the co-acting surfaces of said sealing members, a cylinder communicating with said annular space and a piston slidable within the cylinder, said piston operable by weights to apply static pressure to the liquid metal in the annular space.

4. An electrical connection formed between an outer conductor and an inner conductor rotatable within the outer conductor comprising surfaces defining an annular space extending between the conductors, a liquid metal filling to said annular space forming a continuous electrical connection between the conductors, a seal on each side of the annular space each seal formed by an inner sealing member rotatable within an outer sealing member the sealing members having co-acting surfaces of a material which is not wetted by the liquid metal, means for supplying lubricant to the co-acting surfaces of said sealing members, a header tube partially filled with said liquid metal and communicating with said annular space to apply static pressure thereto, a reservoir partially filled with said liquid metal and communicating with said annular space, and means for adjusting the height of said reservoir relative to said header tube whereby said static pressure can be varied.

5. An electrical connection formed between an outer conductor and an inner conductor carried on a shaft rotatable within the outer conductor comprising surfaces defining an annular space extending between the conductors, a liquid metal filling to said annular space forming a continuous electrical connection between said conductors, a seal on each side of said annular space each said seal formed by an outer sleeve fixed within the outer conductor and an inner sleeve fixed around the shaft within the outer sleeve the co-acting surfaces of said sleeves being of a material which is not wetted by the liquid metal, means for supplying lubricant to the co-acting surfaces of said sleeves, a header tube communicating with said annular space through said outer conductor said header tube being partially filled with said liquid metal to provide a static pressure on the liquid metal in the annular space, a reservoir partially filled with said liquid metal and communicating with said annular space through said outer conductor, and means for adjusting the height of said reservoir relative to said header tube whereby said static pressure can be varied.

6. An electrical connection formed between an outer conductor and an inner conductor carried on a shaft rotatable within the outer conductor comprising surfaces defining an annular space extending between the conductors, a mercury filling to said annular space forming a continuous electrical connection between said conductors, a mechanical bearing on each side of said annular space each bearing formed by an outer sleeve fixed within the outer conductor and an inner sleeve fixed around the shaft within the outer sleeve, the co-acting surfaces of said sleeves being of a material which is not wetted by the mercury and with a small clearance so as to act as a seal for the annular space, means for supplying lubricant to the co-acting surfaces of said sleeves, a cylinder communicating with said annular space through the outer conductor, said cylinder having a quantity of mercury therein to provide a static pressure on the mercury in the annular space, and a piston slidable within said cylinder and operable by weights to vary the static pressure applied to the mercury in the annular space.

References Cited in the file of this patent
UNITED STATES PATENTS

| | | |
|---|---|---|
| 1,170,388 | Anchutz | Feb. 1, 1916 |
| 1,393,942 | Chadwell | Oct. 18, 1921 |
| 1,960,621 | Duplessis | May 29, 1934 |
| 1,991,368 | Bennett | Feb. 19, 1935 |
| 2,424,545 | Bard | July 29, 1947 |
| 2,702,890 | Hildebrandt | Feb. 22, 1955 |
| 2,730,602 | Porterfield | Jan. 10, 1956 |
| 2,832,056 | Stutzman | Apr. 22, 1958 |
| 2,889,531 | Ellerman et al. | June 2, 1959 |

UNITED STATES PATENT OFFICE
CERTIFICATE OF CORRECTION

Patent No. 3,078,432  February 19, 1963

Harold Frederick Kenyon

It is hereby certified that error appears in the above numbered patent requiring correction and that the said Letters Patent should read as corrected below.

In the grant, lines 2 and 3, for "assignor to Metropolitan-Vickers Electrical Company Limited, of London, England, a British company," read -- assignor to Associated Electrical Industries (Manchester) Limited, a British company, --; line 12, for "Metropolitan-Vickers Electrical Company Limited, its successors" read -- Associated Electrical Industries (Manchester) Limited, its successors --; in the heading to the printed specification, lines 5 to 7, for "assignor to Metropolitan-Vickers Electrical Company Limited, London, England, a British company" read -- assignor to Associated Electrical Industries (Manchester) Limited, a British company --.

Signed and sealed this 15th day of October 1963.

(SEAL)
Attest:

ERNEST W. SWIDER
Attesting Officer

EDWIN L. REYNOLDS
Acting Commissioner of Patents